United States Patent Office

3,582,386
Patented June 1, 1971

3,582,386
RESIN BONDING PROCESS
Basil Yankopoulos, Watertown, Mass., assignor to
Amicon Corporation, Lexington, Mass.
No Drawing. Filed Aug. 29, 1968, Ser. No. 756,315
Int. Cl. B44d 1/094, 1/44
U.S. Cl. 117—21                                6 Claims

ABSTRACT OF THE DISCLOSURE

A process for bonding polyelectrolyte complex resin coating to the surface of other materials, said process utilizing an adhesive interlayer comprising a liquid adhesive with polyelectrolyte complex resin particles partly embedded in the liquid adhesive and a step whereby such particles are dissolved by a solvent therefor to become an integral part of said coating.

BACKGROUND OF THE INVENTION

Ionically crosslinked resins, i.e. polyelectrolyte complex resins, are known to the art and have been generally described in an article entitled "Polyelectrolyte Complexes" appearing in Industrial and Engineering Chemistry, a publication of the American Chemical Society in October 1965.

For any of a number of applications, it is desirable to coat articles formed of other materials with such polyelectrolyte complex resins. This may be to improve the physiological compatibility of the articles, to improve the surface electroconductivity thereof, etc. If the article to be coated is porous, such as paper cloth or like material, no serious problem is likely to be encountered in obtaining a good bond of the ionically-crosslinked resin, which lacks any substantial covalent-bonding capacity, to the porous substrate. However, if the resin is to be coated over nonporous articles, for example over polymers like the silicone rubbers or over polyesters like that sold under the trade designation "Mylar" by E. I. du Pont de Nemours and Company, Inc., a serious problem arises in achieving a good bond to the substrate. The problem becomes especially acute in view of the fact that it is most desirable to avoid the use of auxiliary anchoring means which, on wear or because of coating imperfections, may come in contact with material being processed in contact with the polyelectrolyte complex resin surface. One example where this would be a problem would be in blood-processing where it is most desirable to maintain the non-thrombogenic character of the surface.

Therefore, it is an object of the invention to provide a process whereby ionically-crosslinked polyelectrolyte complex resins may be bonded to non-porous substrates.

Another object of the invention is to provide bonds between such polyelectrolyte complex resins using the minimum number of bonding agents or bonding aids possible.

Other objects of the invention will be obvious to those skilled in the art on reading the instant application.

SUMMARY OF THE INVENTION

These objects have been accomplished by a process whereby the selected article, or surfaces thereof, on which it is desired to bond a polyelectrolyte complex resin is first primed with an adhesive which bonds to the substrate and which also bonds, to some extent at least, to polyelectrolyte complex resin. A polysiloxane pressure sensitive adhesive is a highly suitable adhesive for the purpose. This adhesive then serves as a matrix for receiving solid particles of ionically crosslinked polyelectrolyte complex resins which particles are partly embedded in the adhesive matrix but also partly exposed above the matrix. Next a solution of polyelectrolyte complex resin containing a shielding electrolyte is drawn down over the particle-containing adhesive matrix and thereby caused to form a continuous film thereover. As an alternative to this step, and if sufficient particles of resin have been embedded in the adhesive layer, a shielding solvent may be coated directly on the particles and they will dissolve to provide a sufficiently-thick coating of polyelectrolyte complex resin. On deactivating the shielding electrolyte, a film of ionically-crosslinked polyelectrolyte complex resin is formed having an excellent bond to the substrate.

Normally, the polyelectrolyte complex resin particles will be very highly plasticized by the solution coated thereover. The result of this is that, upon completion of the process, there are two phases on the substrate surface, i.e. an adhesive phase and a polyelectrolyte complex resin coating phase. The interface between these two phases, however, is highly irregular and of much greater contact area than had no particles been used in the process. Most important, the bond between the two phases is often of greater strength than the internal strength of the polyelectrolyte complex resin phase itself. This may be because of the increased bonding surface between the two phases and the consequent greater variety of force vectors involved in tearing one phase (the polyelectrolyte complex resin) from the other phase (the adhesive).

The process of the invention is suitably carried out at room temperature, i.e. about 25° C.; however, higher or lower temperatures can be utilized depending on the shielding solution used and the conditions most favorable for deactivating the shielding agent so that the polyelectrolyte complex resin is precipitated as a film therefrom.

The particular adhesive can generally be selected without regard for its physical or chemical properties except that it (1) must be capable of bonding to the substrate surface
(2) must have some capability of bonding to a polyelectrolyte complex resin.

In general most available adhesives do not have sufficient ability to form a good bond with polyelectrolyte complex resins unless used in conjunction with the process of the present invention. Assuming that the surface of the article to be coated is properly selected, suitable adhesives include silicone polymer adhesives such as the polysiloxane adhesives available from the Dow Corning Company, other polymer based adhesives such as those sold under the trade designation Pliobond by the Goodyear Tire and Rubber Company, and, in general, most polymer-based adhesives which have found commercial acceptance. The adhesive, however, must be sufficiently flowable at the desired processing temperatures to allow the embedment of resin particles therein with only moderate pressure. Adhesives having such a degree of flowability are hereinafter referred to as "liquid" adhesives. Among the polymers on which such adhesives may be based are poly(methyl methacrylate), poly(vinyl chloride) and copolymers of vinyl chloride such as poly(vinyl chloride-co-vinyl acetate), poly(vinylidene chloride), poly(vinyl-chloride-co-diacetoneacrylamide), copolymers and terpolymers which contain 2-methyl-5-vinylpyridine such as that sold under the trade designation Philiprene VP by Philips Petroleum Company, poly(chloroprene), i.e. neoprene elastomers by E. I. du Pont de Nemours and Co., Inc., terpolymers of (styrene, acrylonitrile, 1,3-butadiene), GR-S type natural rubber, poly(isoprene), poly(isobutylene), and the like.

The polyelectrolyte resin powder used in the process of the present invention is most advantageously of an average particle size of from 32 to 80 mesh.

Polyelectrolyte complex resins are materials formed of the ionic-crosslinking of polycation and polyanions and are preferably of 20,000 molecular weight or greater but may be as high as 4,000,000 molecular weight or more. Most advantageously, to achieve the greatest degree of crosslinking and the most dimensionally stable materials, the dissociable cation and anion groups should be of the type that, if present in an aqueous solution in non-polymerized form, would have dissociation constants of about $10^{-2}$ or greater. Polyanions and polycations having such groups can be characterized as "strongly-dissociable polyanions" and "strongly-dissociable polycations."

Among the dissociable polycations which may be used as ingredients in preparing the ionically crosslinked polyelectrolytes useful in making dialysis membranes are poly(vinyl benzyl trimethylammonium chloride), poly(ethylene methyloxonium) chloride, poly(vinyl dimethyloxonium) chloride, poly(vinyl benzyldimethyl sulfonium) chloride, poly(vinyl benzyl trimethylphosphonium) chloride, poly(vinyl dimethyloxonium) chloride, polyvinyl pyridinium chloride, poly(diallyl dimethyl ammonium chloride), the heterocyclic amine polycation sold under the trade designation Ionac PP–2021 by Ionac Corporation, a division of Ritter-Pfaudler, Inc., and the like. Of these the quaternary ammonium compounds are most advantageous.

Among the dissociable polyanions which may be used in preparing the polyelectrolyte used in making these membranes are poly(alpha-fluoro acrylic acid), poly(2,2-dichloro-3 butenoic acid), poly(4-vinyl-phenyl difluoro acetic acid), polyvinyl sulfuric acid, polyvinyl sulfonic acid, polyvinyl methylol sulfonic acid, poly-alpha-methylstyrene sulfonic acid, poly(styrene sodium sulfonate), poly(styrene-co-maleic anhydride) and the dissociable salts of such acids, preferably the sodium, potassium or ammonium salts thereof. Of these the sulfonic acid group-containing polymers and their alkali metal salts are most advantageous.

Preparation of an illustrative polyelectrolyte complex resin powder suitable for use in the process of the invention is disclosed below:

Into a 3-gallon polyolefin container is charged three pounds of commercial poly(styrene sodium sulfonate), sold under the trade designation SA 1291.1 by Dow Chemical Company, a polyanion. The container is then filled to about 60% of its capacity with a 90:10 mixture of methanol: distilled water. The resulting mixture is agitated to leach the polyanion. Eight hours leaching in a ball mill (without balls) is sufficient. The resultant mixture is filtered, in several increments, using a large Buchner funnel and No. 1 filter paper. A filter cake is formed and any pasty-grayish substance on top of this cake is discarded after filtering of each increment. Clean filter paper is used with each increment. This entire procedure is repeated at least two more times. Then, the polyanion is placed in a Pyrex tray and dried at a temperature below 150° F.

A commercially-available solution of poly(vinylbenzyl trimethyl ammonium chloride) sold under the trade designation QX2611.7 is treated with 4 parts of acetone to precpitate the polycation therefrom. The remaining acetone-water solution is decanted and several acetone washings are carried out until the acetone is no longer cloudy. Then the precipitated and washed polycation is dried at about 150° F. When dry, the material is redissolved in distilled water and the precipitation, washing and drying steps are repeated. After this second drying, the material is ground to a 40–50 mesh powder in a ball mill.

Solutions are made up as follows:

| Polyanion solution: | Grams |
|---|---|
| Distilled $H_2O$ | 100 |
| Concentrated $H_2SO_4$ | 3000 |
| Polyanion, prepurified | 292 |
| Certified ACS acetone | 3000 |
| Polycation solution: | |
| Distilled $H_2O$ | 2000 |
| Concentrated $H_2SO_4$ | 1500 |
| Polycation, prepurified | 550 |
| Certified ACS acetone | 1500 |

The polyanion is best put into solution at a temperature below 35° C. to avoid undesirable side reactions.

Five parts of the polyanion solution and 2 parts of the polycation solution are mixed together to form a very viscous material. The material is gravity-extruded into water to form spaghetti-like strands. These strands are leached until the wash water is essentialily neutral.

The washed strands are mulched in a 10% hydrochloric acid solution for a moment (1–2 seconds is optimum) in a Waring Blendor and washed with 10% hydrochloric acid several times. The resulting material is washed with acetone until all water has been removed, that is when the specific gravity of the acetone filtrate is 0.80±.05. The material so washed is dried overnight in an oven below 150° F. and ground to a homogeneous powder of <60 mesh. This powder is used in subsequent working examples.

Solvents for such polyanions and polycations include a variety of solvents but, most advantageously, a mixture of water, an organic solvent and an ionic shielding electrolyte such as ionic salts or acids (henceforth called shielding agents) whose function is to prevent ionic interaction between the polyelectrolytes. The salts or acids are usually present in an amount of from at least 10% to 20% by weight of the total solution. Shielding agents are usually highly ionizable electrolytes (in aqueous solution) having pK's of less than about 2.0. Acids like sulfuric, perchloric, hydrochloric and other such acids work well. So do alkali metal salts like sodium bromide, the alkaline earth metal salts, and many others.

The shielding agent may be deactivated to allow forming of a solid film by any of a number of means depending on the nature of the shielding agent.

For example, an evaporative step would get rid of a volatile agent like hydrochloric acid. Other acid shielding agents can be neutralized with a base. One common procedure is simply to evaporate the water or water-organic solvent mixture in which the shielding agent and polyelectrolyte complex resin is dissolved. Suitable organic solvent components include acetone, dioxane lower alkyl alcohols, i.e. those alcohols having volatilities greater than water are preferred.

ILLUSTRATIVE EXAMPLES OF THE INVENTION

Example 1

A silicone rubber sheet was sprayed to about a 0.0005-inch thick coating, with a liquid polysiloxane pressure-sensitive adhesive of the type available from Dow Corning Company under the trade designation Medical Adhesive B. Onto this adhesive was dusted an excess of the polyelectrolyte complex resin powder which powder was pressed into the adhesive matrix with a hand-held mechanical roller. Thereupon, a camel hair brush was used to brush off residual "loose" resin powder. The powder-impregnated surface was then coated with a 15-mil thick film of the following shielding-solvent formulation

| | Parts by weight |
|---|---|
| HCl (37% aqueous) | 4 |
| $C_2H_5OH$ | 4 |
| $H_2SO_4$ (97%) | 1 |
| $H_2O$ (distilled) | 1 |

This coated article is allowed to sit for an hour at about 25° C. (or placed in a circulating-hot-air oven at 40–50° C. for 15–20 minutes) during which time the HCl shielding agent is evaporated and the polyelectrolyte complex resin coating of about 1 to 2 mils thickness forms over the surface of the adhesive.

If desired, residual acid, mostly $H_2SO_4$ can be leached from the resulting article by immersion in water. The resulting bond of polyelectrolyte complex resin to substrate; does not fail even if immersed in water at 250° C. for 72 hours. Tear strength of the bond was not measured since it exceeded the internal strength of the polyelectrolyte film coating itself.

Example 2

A polyester film substrate was coated with a polysiloxane adhesive and polyelectrolyte complex resin powder was coated thereover as described in Example 1.

Thereupon, a 15-mil coating of a polyelectrolyte complex resin solution consisting of 5 parts resin and 95 parts of the shielding solvent described in Example 1 was coated over the powder-coated adhesive. The resulting coated article was allowed to sit for an hour at about 25° C. and a polyelectrolyte complex resin film formed thereover.

The degree of bond-strength was substantially the same as described for the product of working Example 1.

Example 3

A poly(methyl methacrylate) substrate was coated with a 0.014-inch thick adhesive formed of 33% by weight of an acrylic ester polymer sold by Rohm & Haas under the trade designation Acryloid B–66 and 67% by weight of a solvent which was a 60–40 mixture of methyl ethyl ketone and toluene. A quantity of polyelectrolyte complex powder was spread thereover as described in Example 1. Thereupon the coated article was placed in an oven at 50° C. for 30 minutes to allow evaporation of the methyl ethyl ketone-toluene solvent.

Thereupon, a 0.007-inch thick coating of the following polyelectrolyte complex resin solution was applied over the adhesive:

| | Parts by weight |
|---|---|
| Polyelectrolyte complex resin powder | 5 |
| Shielding solution | 95 |

The shielding solution was of the following composition

| | Parts by weight |
|---|---|
| Calcium chloride | 1.0 |
| $C_2H_5OH$ | 2.0 |
| Water | 2.2 |

After coating the resin solution over the particles, it was allowed to partially dry at 25° C. for about 30 minutes. Then another layer of polyelectrolyte complex resin solution was coated thereover and allowed to dry for about 2 hours at 25° C.

The resultant article had an adherent coating of polyelectrolyte complex resin into which the resin particles had merged, thereby forming a highly-irregular interface between the acrylic ester adhesive and the polyelectrolyte complex resin.

What is claimed is:

1. A process for adhering a polyelectrolyte resin to the surface of another material, which polyelectrolyte resin comprises an ionically cross-linked polycation and polyanion and has a molecular weight of at least 20,000, comprising the steps of
   (1) coating the surface of said material with a liquid adhesive composition
   (2) partially embedding solid particles of said resin in such liquid adhesive coating
   (3) coating the resultant particle-coated surface with a liquid shielding solvent composition containing an electrolyte whose function is to prevent ionic interaction between the polycation and polyanion, and
   (4) causing the formation of a film of said resin by removing said liquid shielding solvent composition.

2. A process as defined in claim 1 wherein the liquid shielding solvent composition additionally includes a polyelectrolyte resin comprising an ionically cross-linked polycation and polyanion having a molecular weight of at least 20,000 dissolved in said solvent composition in an amount less than that required to saturate said solvent composition.

3. A process as defined in claim 2 wherein the last said polyelectrolyte resin is the same as the resin of said particles.

4. A process as defined in claim 1 wherein said polyelectrolyte complex resin is formed of polycation which is a quaternary ammonium compound and a polyanion which is a sulfonic acid-group containing polymer or salt thereof.

5. A process as defined in claim 4 wherein said polyanion is poly(styrene sodium sulfonate) and said polycation is poly(vinyl benzyl trimethyl ammonium chloride).

6. An article having an underlying layer of an adhesive and an overlying layer of a polyelectrolyte resin film comprising an ionically crosslinked polycation and polyanion and having a molecular weight of at least 20,000, the interface between said layers being highly irregular in configuration.

References Cited

UNITED STATES PATENTS

| | | | |
|---|---|---|---|
| 3,355,319 | 11/1967 | Rees | 117—138.8E |
| 3,401,152 | 9/1968 | Wessling et al. | 117—132C |
| 3,475,358 | 10/1969 | Bixler et al. | 117—161UIN |
| 3,481,756 | 12/1969 | Kong | 117—72 |

WILLIAM D. MARTIN, Primary Examiner

R. M. SPEER, Assistant Examiner

U.S. Cl. X.R.

117—33, 72